Nov. 8, 1960 R. A. WILLIAMS 2,959,648
ELECTROMAGNETIC SWITCHING DEVICE
Filed Nov. 13, 1957 3 Sheets-Sheet 1
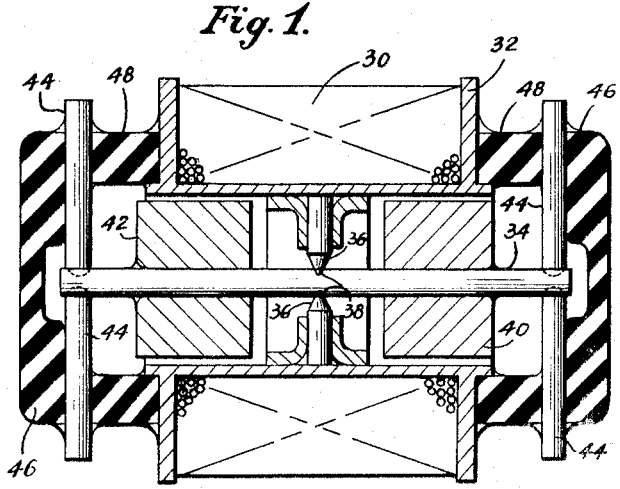
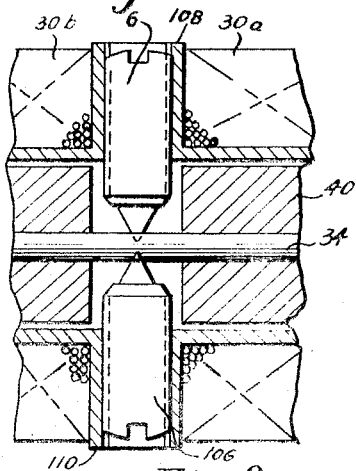
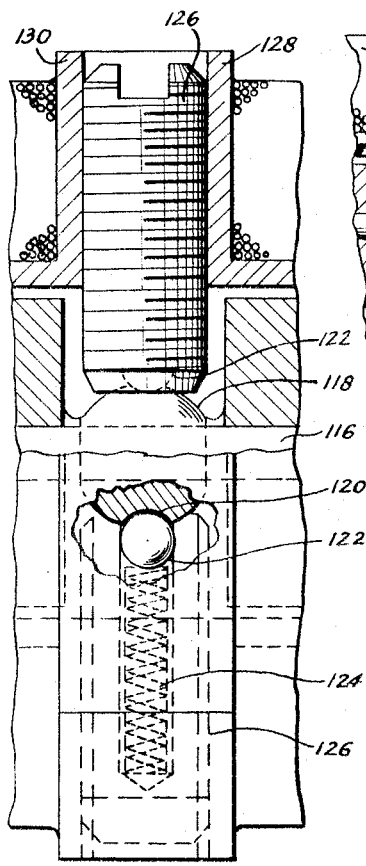
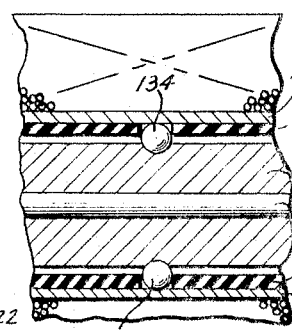
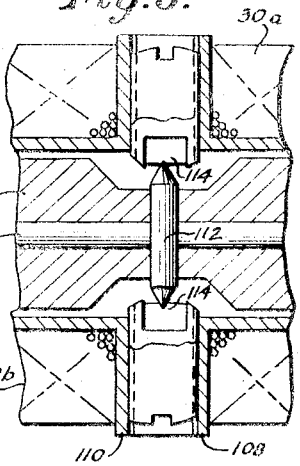
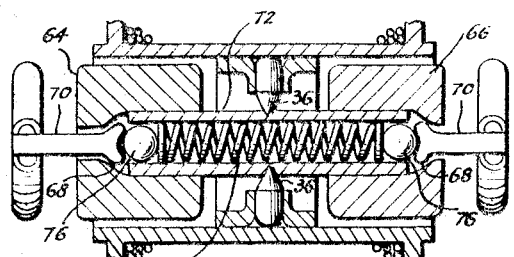
INVENTOR
ROBERT A. WILLIAMS
BY Cushman, Darby & Cushman
ATTORNEYS

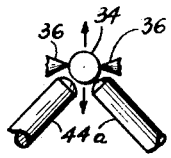
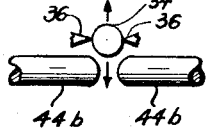
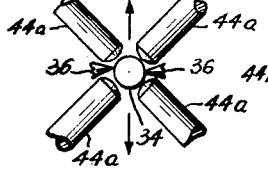
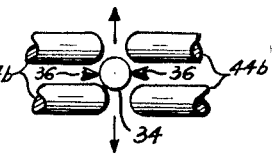
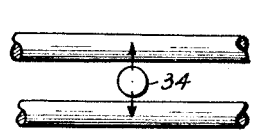
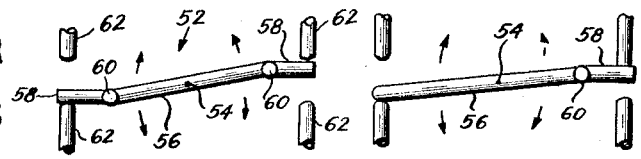
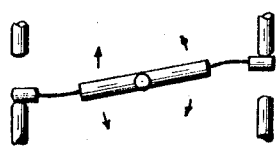
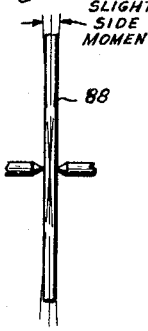
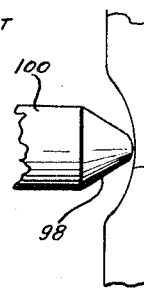
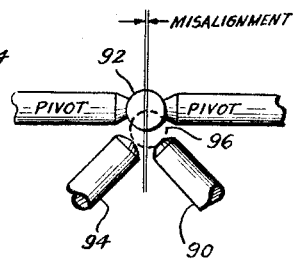
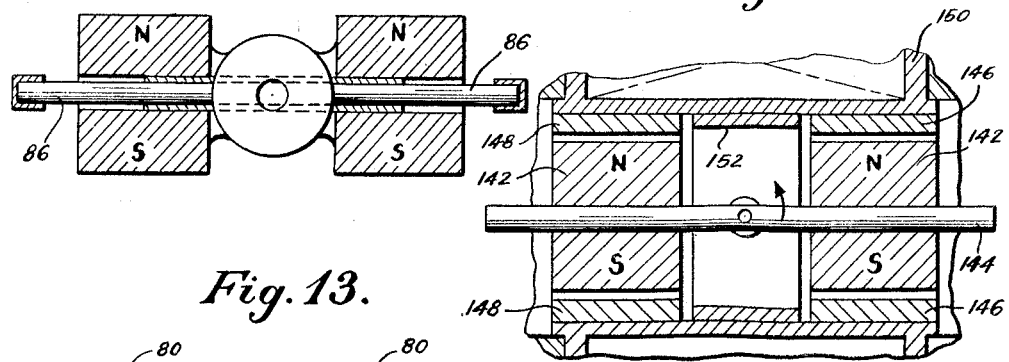
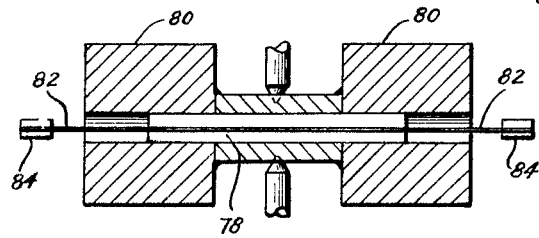

Nov. 8, 1960

R. A. WILLIAMS 2,959,648

ELECTROMAGNETIC SWITCHING DEVICE

Filed Nov. 13, 1957

INVENTOR
ROBERT A. WILLIAMS

BY Cushman, Darby & Cushman
ATTORNEYS

United States Patent Office 2,959,648
Patented Nov. 8, 1960

2,959,648

ELECTROMAGNETIC SWITCHING DEVICE

Robert A. Williams, Fort Worth, Tex., assignor to Rawco Instruments, Inc., Fort Worth, Tex., a corporation of Texas Filed Nov. 13, 1957, Ser. No. 696,113

30 Claims. (Cl. 200—87)

This invention relates to an electromagnetic switching device which because of its simplicity allows miniaturization without sacrifice of reliability and ruggedness.

The switching device of this invention has a versatility which allows it to perform a wide variety of functions in electronic circuitry. Notable among such functions, without limitation intended, is the operation of the switching device as a D.C.-A.C. chopper with either single or double pole and single or double throw action; a normally null or closed polarized millisecond relay; a current sensitive polarized relay; a resilient relay or vibrator; polarized snap action type relays which when used in large numbers may be assembled in small areas for memory use or switch banks for integrating, telemetering, computing, and binary count installations. Numerous other uses are also envisioned for the switching device of this invention, and it is to be emphasized that a switching device constructed in accordance with this invention can be made exceptionally small so that 100 of these devices, for example, can be mounted in at least a space as small as 3½" x 2½" x ⅝".

The electromagnetic switching device of this invention is exceptionally shock resistant and has an extremely fast response with large dwell time and a minimum of OFF time, the symmetry of the dwell times for different contacts being within a few degrees. Chatter for the switching device of this invention is practically nil and the contact emfs are eliminated in accordance with the third metal law and contact configurations employed. The noise factor is reduced to practically zero since the construction permits shielding of the contacts from coil fields. Power requirements are extremely low, life exceptionally long (5000 hours or more at 400 c.p.s.), operating temperatures may range from —60 to 150° C., signal output is uninterrupted through ambient variations and can be of any frequency from 0 to 10,000 c.p.s., for a switching device constructed in accordance with this invention.

One inventive aspect of this invention is the placement of the armature magnet means both within and without the coil means so that the distance between the magnet poles and a coil pole established by energizing the coil means is as short as physically possible when the armature is in its central position.

The permanent magnet means is made of exceptionally light weight material and, with the distance between the poles being extremely short, the force of action between the magnet and coil poles is greatly increased.

In another aspect of this invention the armature means is made so that at least one of its ends is movable between its contacts relative to the remaining portion of the armature. This is accomplished, for example, by a hinge action joint in the length of the armature or by making the armature end of resilient material. With such structures, positive contact with the switch contacts is made and longer dwell time is provided along with greater snap action.

Another aspect of the invention is the provision of means for allowing at least one armature end, which makes contact with the switch contacts, to move in directions other than the pivotal directions of the armature. This is accomplished by making the above mentioned hinge joint a ball and socket joint or by using universal type couplings at the pivot point for the armature.

It is therefore the primary object of this invention to provide an improved electromagnetic switching device which is so constructed as to permit extreme miniaturization thereof.

Another object of this invention is the provision in an electromagnetic switching device of permanent magnet means carried by a pivoted armature with the magnet means being partially within and partially without the coil means surrounding the magnet means so that the poles of the magnet means are as close as physically possible to, if not in alignment with, a coil pole when existing while the armature is in its central or equilibrium position.

Another object of this invention is the provision in an electromagnetic switching device of pivoted armature means and means for allowing an end of the armature means to move in directions other than the pivotal directions whereby the switch contacts are squarely contacted by the armature end and the armature length may be made non-conductive.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1 illustrates an embodiment employing a single coil and two permanent magnets;

Figure 2 illustrates an embodiment employing two coils and two magnets;

Figure 3 illustrates an embodiment employing two coils and a single magnet;

Figures 4, 5, 6, 7 and 8 illustrate different contact configurations which may be employed in any embodiment of this invention;

Figure 21:
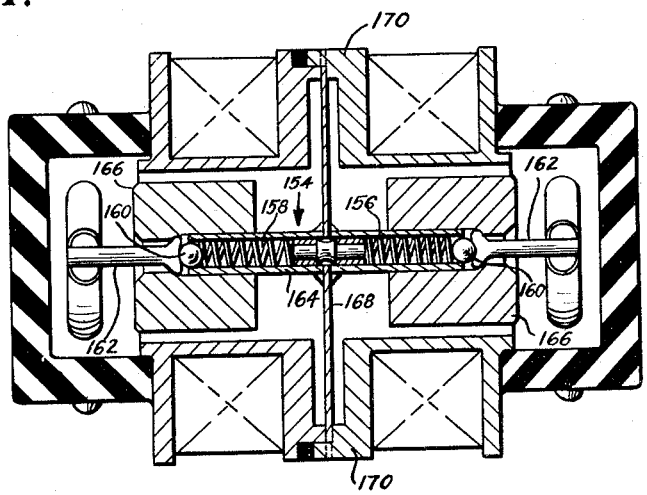
Figure 22:
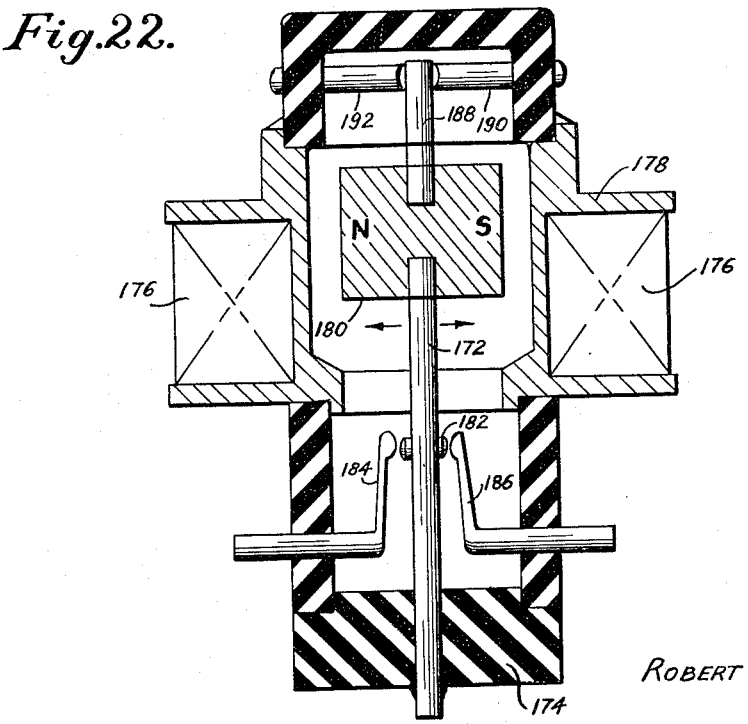

Figures 9, 10 and 11 schematically illustrate different modifications of the armature means of this invention;

Figure 12 illustrates an embodiment wherein the armature means includes ball and socket joints;

Figure 13 illustrates an embodiment of flexible armature ends;

Figure 14 illustrates another embodiment of flexible armature ends;

Figures 15 and 16 illustrate how the armature ends make contact with contacts one or both being misaligned;

Figure 17 illustrates in a partial view the detail of universal pivot mounting means;

Figure 18 illustrates a ball pivot embodiment for universal action of the armature;

Figure 19 illustrates another ball pivot universal armature action embodiment;

Figure 20 illustrates a switching device in accordance with this invention which has enhanced snap action, and Figures 21 and 22 illustrate different configurations for armature vibration.

The electromagnetic switching device illustrated in Figure 1 includes a coil 30 wound on a non-magnetizable coil support form 32 preferably made of copper. The coil as well as its form define an elongated internal aperture in which there is disposed an armature 34 pivotally mounted by pivots 36 suitably connected to the interior of the coil support 32 to be electrically insulated therefrom or not as desired. Pivots 36 may be of sapphire if electrical discontinuity is desired between coil form 32 and armature 34. The seats 38 for the pivots are ground or otherwise formed in the armature 34. Attached to the armature at either side of the pivot points are permanent magnets 40 and 42. At both ends the armature 34 extends outwardly from the aperture so as to be in close proximity to contacts 44. Pivots 36 and seats 38 mount the armature and magnets at their combined center of gravity so as to make the switching device less subject to operation by external shock or the like. Ceramic or "Teflon" caps 46 including spacers 48 hold a pair of contacts 44 in a given relation relative to the respective ends of armature 34 and away from the coil 30 so as not to be subject to any effect produced by the field thereof.

It is to be understood that a cross-sectional view (not shown) of Figure 1 would indicate that the coil support 32 as well as permanent magnets 40 and 42 are circular. However, these elements may have any other desired configuration.

Permanent magnets 40 and 42 are preferably composed of light weight materials such as the now available ceramic barium carbonate iron oxide magnets or magnesium bismuth magnets. By using such permanent magnets, a high force to weight ratio may be obtained in the manner to be presently described. Each of the magnets is polarized so that one pole of the magnets is effectively in the portion thereof on one side of armature 34, while the other pole of each magnet is on the opposite side of the armature. The magnetism of each of the magnets is effectively pronounced at the poles of the magnets, and the poles may be considered as substantially at the top and bottom of a pole axis line which extends centrally of the magnets.

As is well known, a coil of wire produces a north and south pole substantially at opposite ends of the coil when current is passed therethrough. As may be seen in Figure 1, each of the permanent magnets 40 and 42 is disposed along the length of armature 34 so that their opposite cooperating poles (i.e., the north and south pole of each) are on a pole axis line which intersects a pole produced by the coil. In this manner, each of the poles of either magnet is as close as possible to a coil pole when the armature 34 is in a central or unpivoted position. In this state, the armature is in an equilibrium position so that upon energization of the coil, the poles established at either end thereof effectively produce a force which causes the armature to pivot in one or another of its pivotal directions. The force between the poles of the coil and those of the magnets is maximum since the distance between a coil pole and either pole of the adjacent magnet is reduced to a minimum. Such a pole distance reduction considerably increases the force causing the armature to pivot, since the force is inversely proportional to the square of the distance between a coil pole and a magnet pole. Protrusion of the magnets 40 and 42 beyond the ends of coil 32 not only provides for an increase in pivotal force, but in the embodiment of Figure 1, allows maximum increase thereof since the pole axes of the magnets are aligned with the poles of the coil respectively.

Instead of having one coil as in Figure 1, two coils 30a and 30b may be provided as in Figure 2, thereby increasing the combined magnetic pole strength of the coil poles. Coils 30a and 30b may have the same polarity or opposite polarities, and in either case may be in series or parallel. When the coils have similar polarities, the magnets 40 and 42 have like poles on the same side of armature 34. However, when the coils are of opposite polarity, the polarities of the poles of the magnets on the same side of armature 34 are opposites. This latter opposite polarity configuration produces the same result as where the coils and magnets have the same polarity except that more heat is generated although less external field is produced.

The permanent magnets of Figure 1 need not be separated, but may be combined as one continuous magnet 50 as shown in Figure 3, and this with either a single or double coil. The poles of permanent magnet 50 are concentrated more toward the end of the magnet than at the center thereof and because of extension of the magnet beyond the coil ends, as in Figure 1, the poles are as close as physically possible to the opposite end poles of the coils 30a and 30b. It is also to be understood that the single magnet 50 of Figure 3 may be used in conjunction with a single coil.

The contacts 44 of Figure 1 may be arranged relative to armature 34 in either of the manners shown in Figures 4 and 5. The contacts 44a in Figure 4 are arranged at a 90° angle to each other so that when armature 34 is pivoted, and its end is thereby moved downwardly, each of contacts 44a is contacted thereby. With the arrangement of contacts 44a as in Figure 4, the ends of the contacts may have a relatively large radius and thereby present a comparatively large surface area for the armature to contact.

With the contacts arranged at a 180° angle to each other as shown in Figure 5 by contacts 44b, the ends of the contacts may have a comparatively small radius. However, upon pivoting of the armature 34 downwardly, a solid contact is made between the contacts 44b.

As previously indicated, the electromagnetic switching device of this invention may be employed in numerous ways. If several contacts are needed at each end of the device, these contacts may be arranged in any of the manners shown not only in Figures 4 and 5, but also in Figures 6, 7 and 8, according to the result desired. The contact arrangements of Figures 4 and 5 may be used to provide a single pole switch with either single or double throw action according to whether like sets are employed at each end of the armature and whether the armature effectively shorts a set of contacts at one end with a set of contacts at its other end. In like manner, the contact arrangements of Figures 6 and 7 may be employed to form a single or double pole, double throw switch. A similar switch may be formed by the use of contacts arranged in the manner shown in Figure 8 disposed at either end of the armature if the armature is fully current conductive so as to cause a short between two contacts at opposite ends of the armature.

Armature 34 of Figure 1 is shown as a rigid bar. However, it need not be rigid throughout its length. For example, the armature may be designed so that the portions thereof contacting the contacts is movable relative to the remaining portion of the armature. This is schematically illustrated in Figures 9, 10 and 11 wherein the armature 52, pivoted about point 54 includes a relatively rigid portion 56 and end portions 58 which are coupled to the portion 56 by hinge, knee or ball action devices 60 to be hereinafter described in more detail. With an armature comprised in such a manner, the end portions 58 thereof make contacts 62 more squarely, and stay in contact therewith for a longer time, thereby providing a greater dwell or ON time for the switch. The devices 60 may be such that they provide electrical continuity between opposing end contacts 62, or in the alternative, prevent conduction therebetween so that armature portions 58 merely short two contacts in the manner shown in Figure 4 for example. In some instances, it is desirable to make the armature so that only one end portion 58 is movable relative to the remainder of the armature. Such a configuration is shown in Figure 10.

Figure 12 illustrates one type of device which will provide the end portions of the armature with flexibility in the manner shown in Figure 9. Magnets 64 and 66 are apertured with a large diameter opening on the inner sides thereof and a smaller diameter opening on the outer sides thereof with shoulders 68 separating the two diameter apertures. The end portions 70 of the armature extend through the smaller diameter openings and have an enlarged, socket type end which abuts shoulder 68. The diameter of the end portions 70 is smaller than the smaller aperture openings of the magnets 64 and 66 so that hinge or sidewise movement of the armature ends 70 is possible. Tube 72 extends between the shoulders 68 and confines spring 74 which holds balls 76 against the socket therefor of armature ends 70 respectively. Balls 76 may be either of electrically conductive material or non-conductive material according to the use in which the switching device is to be employed.

Figures 13 and 14 illustrate flexible type armature ends which have previously been referred to in relation to Figure 11. In Figure 13 the armature comprises a rigid member 78 mounted in the centrally drilled apertures of permanent magnets 80. The rigid member 78 does not extend to the opposite ends of the magnets, but provides an open space in which the flexible member 82 may be flexed. Member 82 may be a wire or ribbon, for example, which extends all the way through member 78, or at least from the ends thereof. Caps 84 are provided on the outer ends of the flexible members 82 for making contact with the contacts.

In Figure 14, the flexible armature end comprises a resilient member 86 such as a silicon rubber or plastic rod. In the alternative, the resilient rod may be a wire spring. In any case, the resilient member is capped at its outer end as in Figure 13.

One of the inventive features of the present electromagnetic switching device is that at least the armature ends may move in directions other than in the pivotal directions. This is accomplished in any one of several ways and is particularly provided to compensate for any misalignment between contacts. Figure 15 schematically illustrates a rigid armature 88. However, it is to be understood that the rigidity of the armature means of this invention is only such that although it generally stays straight, its ends at least may move a slight amount under the force of the poles produced by current through the coil. Therefore, in one embodiment, the armature 88 of Figure 15 is indicated as being able to move not only in the pivotal direction, but also in other directions, particularly sidewise, so as to effectively give the armature a universal movement. When the ends of the contact are slightly worn for example, or when the contacts are improperly positioned, it cannot make contact with the contacts simultaneously. Such a situation is shown in Figure 16 where the contact 90 is further from armature 92 than is contact 94. Therefore, upon movement of the armature downwardly, its end at least must necessarily move slightly to the lower right at the same time in order to make full contact as shown by dotted circle 96 with each of contacts 90 and 94.

One way of providing for movement of an armature end in directions other than the pivotal directions is shown in a partial view in Figure 17. Point 98 of pivot 100 has a relatively small radius when compared to the radius of seat 102 which is formed in armature 104. Therefore, armature 104 may move not only in the pivotal direction, but in many other directions so as to compensate for any possible contact misalignment.

It is to be understood that the pivots and seats shown in Figures 2 and 3 may also be formed in the manner illustrated in Figure 17. In addition, the pivots or seats may be made adjustable as shown in either one of these figures, so that the armature may be initially made to move in numerous directions with ease yet be retained by the pivots. The adjustability in Figure 2 is provided in a two-coil configuration by making the outer ends of the pivots 106 threadedly engage the central part of coil forms 108 and 110. In Figure 3, the pivot points are formed on both ends of a pivot rod 112 which extends through the central portion of permanent magnet 50 and armature 34, with the seats 114 threadedly engaging coil forms 108 and 110. As previously indicated, the seats for the pivot points in both Figures 2 and 3 may have a radius larger than the radius of the pivot point used therewith.

Other structures which permit the armature ends, and in this case the whole armature, to move not only in pivotal directions but also in other directions, are shown in Figures 18 and 19. In Figure 18, the armature 116 passes through a central aperture in a ball type sapphire pivot 118. In a direction perpendicular to the hole drilled in the ball pivot 118, two dimples 120 are disposed on the surface of the ball pivot for seating a second smaller ball 122. These smaller balls 122 are maintained in the dimple seats 120 by spring 124 contained in a cavity within mounting screw 126 which threadedly engages the double winding coil supports 128 and 130. With the armature mounted in such a manner, it may not only pivot, but may also move in a plurality of directions except that it cannot rotate about the longitudinal axis of the armature 116. This latter restriction is present in all of the embodiments herein, and the universal mounting shown in Figure 18 may be employed with any of the other embodiments in this application except for the resilient types shown in Figures 21 and 22.

Figure 19 illustrates a relatively lower cost method of construction with the dimple seats ground or otherwise disposed in the magnet 132 for receiving ball pivots 134. The ball pivots are held in place by a tube 136 inserted inside the coil support form 138. Two apertures in the tube 136 are made slightly larger than the diameter of balls 134, thereby allowing slight sidewise movement of the armature 140 as well as pivotal movement thereof.

In addition to the foregoing structures for providing movement of the armature in a plurality of directions to compensate for any misalignment in contacts, the structure shown in Figure 12 effectively accomplishes the same end, even though the seats for pivots 36 have substantially the same radii as their respective pivot points. That is, with the ball 76 and socket of armature end 70 operating to provide relative movement between the armature end and the central portion 72 of the armature, the armature end may move in a plurality of directions including the pivotal directions. This feature of the structure of Figure 12 is in addition to the feature previously described relative thereto and to Figures 9 and 10 indicating that the armature end may be electrically decoupled from the remainder of the armature by hinge, knee or ball action devices.

The flexible armature end of Figure 13 and 14 may likewise provide for movement of the armature ends in a plurality of directions so as to compensate for any misalignment of contacts.

Although a certain amount of snap action is inherent in the armature movement particularly when the armature ends are made flexible or movable relative to the central portion of the armature, additional snap action may be provided by the addition of magnetizable material such as soft iron near the poles of the magnet or magnets employed in the switching device. Figure 20 illustrates such a construction when two magnets 142 are disposed on a pivoted armature 144. The magnetizable elements 146 and 148 are disposed respectively around the permanent magnets and interiorly of the coil support form 150 with spacer 152, preferably of non-magnetic material, being disposed between the magnetizable elements 146 and 148. Rather than extending completely around the permanent magnets, the magnetizable elements 146 and 148 may each comprise two sections of magnetizable material with each section being disposed respectively over the poles of the associated permanent magnet. In either case, the establishment of coil poles by current passing through the coil magnetizes the magnetic elements 146 and 148 in accordance with the type of pole established at the end of the coil most adjacent to the magnetizable elements. Consequently, when armature 144 is pivoted upon an energiaztion of the coil, the action between the permanent magnet and the magnetized material is maintained even after the coil energization ceases so that the armature maintains its switched position until the coil is energized in an opposite direction. When the magnetic elements 146 and 148 each consist of two sector rings, one for each of the poles, normally closed or normally opened switching action may be obtained. It is to be understood that the addition of magnetizable elements 146 and 148 may be employed in any of the foregoing embodiments to provide a switching device with enhanced snap action.

As previously indicated, the electromagnetic switching device of this invention may be employed as a resonant relay or vibrator. Figure 21 illustrates a structure for such a configuration. Each half of the armature 154 is similar to corresponding halves of the armature shown in Figure 12 except that two springs 156 and 158 are employed rather than the single spring 74 in Figure 12. Springs 156 and 158 press against ball pivots 160, which in turn press against the armature ends 162 to give relative movement between the armature ends and the central portion of the armature. The other ends of springs 156 and 158 are held in a given position in any suitable manner within tube 164. At the combined center of gravity of armature 154 and permanent magnet 166, there is attached a resilient member 168 which is connected at its outer ends to the coil support form 170 in any suitable manner for armature pivoting purposes. The resilient member 168 may be either a ribbon or a diaphragm. By using either one of these, greater motion can be obtained at higher frequencies. However, it is to be understood that any of the pivot means previously described may also be employed in a vibrator configuration as long as the frequency is not so high as to preclude use thereof. Although the vibrator of Figure 21 is illustrated as using a ball and socket type armature for movement of the armature ends relative to the central portion of the armature end for providing for any misalignment of contacts, it is to be understood that the armature may be constructed in an of the manners heretofore described. With the ribbon or diaphragm mounting of the armature, little or no motion of the armature results until the frequency of the coil energization matches the resonant frequency of the armature movement.

Another vibration type switching device in accordance with this invention is shown in Figure 22. In this embodiment, the armature 172 may be a round or rectangular reed securely mounted in end cap 174 for vibrational energization at the operating frequency of coil 176 mounted in support 178. As described for the embodiment of Figure 1, the permanent magnet 180 is mounted on the armature at a point where the magnet poles are as close as possible to the coil poles when the armature is in its equilibrium or central position. This provides for exceptional force between the coil and magnet poles. As the coil energization varies, the magnet and armature 172 are vibrated so that the contact cap 182 makes contact with the contacts 184 and 186 alternately. In addition, armature 172 may extend from the upper end of magnet 180 with a resilient or rigid rod 188 for making shorting contacts on each sidewise movement, or alternatively, to form another vibrating circuit between contacts 190 and 192.

Thus it in apparent that there is provided by this invention an electromagnetic switching device in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. An electromagnetic switching device comprising coil means defining an elongated aperture and at least potentially defining two magnetic poles substantially at opposite ends of the coil means, a plurality of contacts disposed adjacent at least one end of said coil means, armature means extending within and protruding from said aperture for contacting said contacts, permanent magnet means disposed on said armature means in such a manner that a line intersecting opposite cooperating poles of the magnet means is perpendicular to the length of said armature means, and means for pivotally mounting the armature and magnet means substantially at their combined center of gravity for movement thereof from a given equilibrium position in the pivotal directions whereby the coil means poles when existing cause the armature means to contact at least one of said contacts, the armature means being partially within and partially without said aperture so that the distance between a coil means pole and either of two opposite cooperating magnet means poles is the shortest possible distance therebetween when the armature means is in said equilibrium position.

2. An electromagnetic switching device as in claim 1 wherein said magnet means is disposed on the armature means so that a coil means pole is substantially intersected by a magnet means pole axis.

3. An electromagnetic switching device as in claim 1 wherein the contacts at one end of the coil means are disposed 90° relative to each other and the protruding armature contacts two so disposed contacts substantially simultaneously.

4. An electromagnetic switching device as in claim 1 wherein at least two of the contacts at one end of the coil means are disposed 180° relative to each other and are adapted to be contacted by the protruding armature substantially simultaneously.

5. An electromagnetic switching device as in claim 1 and further including means associated with said armature means for permitting at least the portion thereof protruding from said aperture to move freely in other directions in conjunction with said pivotal directions.

6. An electromagnetic switching device as in claim 5 wherein the pivotal mounting means includes two pivots on opposite sides of said armature means, said pivots having a given point radius, and seats for said pivots, said further included means comprising said seats with a radius substantially larger than the radius of the pivot points.

7. An electromagnetic switching device as in claim 6 wherein said seats are disposed in said armature means.

8. An electromagnetic switching device as in claim 6 and further including a coil form for holding said coil means, said seats being attached to said coil form and said pivots extending from the armature means.

9. An electromagnetic switching device as in claim 5 wherein the further included means comprises a ball action device coupling the protruding portion of the armature means with another portion thereof.

10. An electromagnetic switching device as in claim 5 wherein the pivotal mounting means includes a ball and seats therefor.

11. An electromagnetic switching device as in claim 10 wherein the means for permitting movement of the armature means in said other directions includes said ball and seats, the latter including two other balls substantially smaller in diameter than the first mentioned ball.

12. An electromagnetic switching device as in claim 1 wherein said magnet means comprises two permanent magnets spaced from each other on the armature means, each magnet protruding from the ends of said aperture respectively with the poles of each being as close as physically possible to one of the coil means poles when the armature means is in said equilibrium position.

13. An electromagnetic switching device as in claim 12 wherein a plurality of said contacts are disposed adjacent both ends of said coil means and the armature means protrudes from both ends of said elongated aperture for contacting at least one contact at opposite ends simultaneously, at least one of the protruding portions of said armature means being movable relative to another portion of said armature means.

14. An electromagnetic switching device as in claim 13 wherein the movable protruding end portion of the armature means is coupled to said another portion of the armature means by a ball and socket device.

15. An electromagnetic switching device comprising coil means defining an elongated aperture and at least potential defining two magnetic poles substantially at opposite ends of the coil means, a plurality of contacts disposed adjacent at least one end of said coil means, armature means extending within and protruding from said aperture for contacting said contacts, permanent magnet means disposed on said armature means in such a manner that a line intersecting opposite cooperating poles of the magnet means is perpendicular to the length of said armature means, and means for pivotally mounting the armature and magnet means substantially at their combined center of gravity for movement thereof from a given equilibrium position whereby the coil means poles when existing cause the armature means to contact at least one of said contacts, at least that portion of the armature means extending from the pivot means to the contacts at one end comprising a rigid portion adjacent the pivot mounting means, the remaining portion thereof being coupled to said rigid portion by a ball and socket device.

16. An electromagnetic switching device comprising coil means defining an elongated aperture and at least potentially defining two magnetic poles substantially at opposite ends of the coil means, a plurality contacts disposed adjacent at least one end of said coil means, armature means extending within and protruding from said aperture for contacting said contacts, permanent magnet means disposed on said armature means in such a manner that a line intersecting opposite cooperating poles of the magnet means is perpendicular to the length of said armature means, means for pivotally mounting the armature and magnet means substantially at their combined center of gravity for movement thereof from a given equilibrium position in the pivotal directions whereby the coil means poles when existing cause the armature means to contact at least one of said contacts, and means associated with said armature means for permitting at least the portion thereof protruding from said aperture to move freely in other directions in conjunction with the pivotal directions.

17. An electromagnetic switching device as in claim 16 wherein the pivotal mounting means includes two pivots having points of given radii and seats therefor, the means for permitting movement of the armature means in said other directions including said seats with radii substantially larger than said pivot point radii respectively.

18. An electromagnetic switching device as in claim 16 wherein the pivotal mounting means includes a ball and seats therefor.

19. An electromagnetic switching device as in claim 18 wherein the other direction movement means includes said ball and seats, said seats including two other balls of substantially smaller diameter than the first mentioned ball.

20. An electromagnetic switching device as in claim 16 wherein the means for permitting movement in said other directions of the portion of the armature means protruding from the aperture includes a hinge action device coupling said protruding portion to the remainder of said armature means.

21. An electromagnetic switching device as in claim 16 wherein two of said contacts disposed at one end of the coil means are arranged to be contacted upon movement of the armature means in said pivotal directions even if either of said two contacts is slightly misaligned with the axis of the armature means.

22. In an electromagnetic switching device having coil means adapted to receive electrical excitation and defining an aperture with a longitudinal axis, armature means disposed at least partially within said aperture and including at least one contact shorting element, means for pivotally mounting said armature means so that the armature means and its shorting element may rotate due to said excitation in two opposing pivotal directions from a given equilibrium position, said pivotal mounting means including in operative association therewith means for permitting freedom of movement of the armature means in two opposing directions transverse to said pivotal directions and also transverse to said longitudinal axis of the coil means aperture, and at least one pair of spaced apart electrical contacts situated generally on opposing sides of said shorting element with at least a part of the surfaces of said contacts generally diverging so that when due to said excitation the armature means rotates in a pivotal direction toward said contacts, the shorting element positively contacts said diverging part of the surface of each contact so as to electrically interconnect same even, by virtue of the freedom of movement of the armature means in said transverse directions, when for any reason one of said surfaces is initially contacted by the shorting element before the other of said surfaces.

23. In an electromagnetic switching device having coil means adapted to receive electrical excitation and defining an aperture with a longitudinal axis, armature means disposed at least partially within said aperture and including at least one contact shorting element, means for pivotally mounting said armature means so that the armature means and its shorting element may rotate due to said excitation in two opposing pivotal directions from a given equilibrium position, said pivotal mounting means including in operative association therewith means for permitting freedom of movement of the armature means in two opposing directions transverse to said pivotal directions and also transverse to said longitudinal axis of the coil means aperture, and at least one pair of spaced apart electrical contacts situated generally on opposite sides of said shorting element with at least a part of the surfaces of said contacts generally diverging so that when due to said excitation the armature means rotates in a pivotal direction toward said contacts, the shorting element positively contacts said diverging part of the surface of each contact so as to electrically interconnect same even, by virtue of freedom of movement of the armature means in said transverse directions, when for any reason one of said surfaces is initially contacted by the shorting element before the other of said surfaces, each of said contacts being a rod disposed relative to each other at a predetermined angle.

24. A device as in claim 23 wherein said predetermined angle is approximately 90° and the contact surface of each rod has a radius at least as large as the radius of the rod.

25. In an electromagnetic switching device having coil means adapted to receive electrical excitation and defining an aperture with a longitudinal axis, armature means disposed at least partially within said aperture and including at least one contact shorting element, means for pivotally mounting said armature means so that the armature means and its shorting element may rotate due to said excitation in two opposing pivotal directions from a given equilibrium position, said pivotal mounting means including in operative association therewith means for permitting freedom of movement of the armature means in two opposing directions transverse to said pivotal directions and also transverse to said longitudinal axis of the coil means aperture, and at least one pair of electrical contacts situated adjacent said shorting element on opposite sides of a plane in which the longitudinal axis of the shorting element moves when rotated in said two pivotal directions and at least mainly on one side of a transverse plane passing through said equilibrium position orthogonal to said shorting element axis, said contacts being disposed so that the minimum distance between the respective surfaces thereof as measured along a line between a point on each contact surface, which line is in a plane mutually perpendicular to the aforementioned planes, is less than the transverse width of said shorting element and so that corresponding areas of at least a part of said surfaces from their respective minimum distance points diverge in the general direction toward said transverse plane, the arrangement being such that said contacts are always shorted by said shorting element when due to said excitation the armature means is rotated in the pivotal direction corresponding to said one side of said transverse plane even when two points respectively on said surface areas and lying in any line parallel to said transverse plane are other than equidistant from said first mentioned plane by virtue of the freedom of movement of the shorting element in said transverse directions.

26. In an electromagnetic switching device, at least one pair of spaced apart electrical contacts, armature means including means for shorting said contacts, an armature means support, and means for mounting said armature means on said support at least pivotally around a given axis and resiliently in either direction parallel to said axis to allow for biased relative movement of the armature means and support in either of said directions in conjunction with, and in the absence of, pivotal movement of the armature means about said axis, whereby damage to said armature means, its shorting means, and said contacts is at least substantially precluded even if said device is subjected to shock, vibration or the like.

27. In an electromagnetic switching device, at least one pair of spaced apart electrical contacts, armature means including means for shorting said contacts, means for at least pivotally mounting said armature means, and means for resiliently supporting a part of said mounting means, said pivotal mounting means including two pivot bearings, and the resilient supporting means including spring bias means adjacent each of said bearings, the arrangement being such that damage to said armature means and contacts is at least substantially precluded even if said device is subjected to shock, vibration or the like.

28. In an electromagnetic switching device, at least one pair of spaced apart electrical contacts, armature means including means for shorting said contacts, means for at least pivotally mounting said armature means including a relatively large ball mounted on said armature means and having two dimple seats on opposite sides and two relatively small balls, respectively, for said seats, and means for resiliently supporting each of said small balls including spring bias means adjacent said small balls, the arrangement being such that damage to said armature means and contacts is at least substantially precluded even if said device is subjected to shock, vibration or the like.

29. In an electromagnetic switching device, at least one pair of spaced apart electrical contacts, armature means including means for shorting said contacts, an armature means support for at least pivotally mounting said armature means in said support around a given axis, and means effectively between said support and armature means for resiliently supporting a part of said mounting means, said pivotal mounting means including two pivot bearings as said part thereof, and the resilient supporting means including spring bias means adjacent each of said bearings for resiliently supporting same to allow biased relative movement between said support and armature means in directions parallel to said axis, the arrangement being such that damage to said armature means, its shorting means, and said contacts is at least substantially precluded even if said device is subjected to shock, vibration or the like.

30. In an electromagnetic switching device, at least one pair of spaced apart electrical contacts, armature means including means for shorting said contacts, an armature means support, two sets of first and second means for causing at least pivotal mounting of said armature means relative to said support around a given axis, said sets being disposed respectively on opposite sides of the armature means with the first and second means of each set forming a bearing as to each other and being respectively associated and operatively connected with said armature means and support, and resilient means for each of said sets for forming one of the operative connections between one of the first and second means in the set and its associated armature means or support as the case may be to allow biased relative movement between the support and armature means in directions parallel to said axis, whereby damage to said armature means, its shorting means, or said contacts is at least substantially precluded even if said device is subjected to shock, vibration or the like.

References Cited in the file of this patent

UNITED STATES PATENTS

| | | |
|---|---|---|
| 1,085,810 | Hoge | Feb. 3, 1914 |
| 2,428,218 | Herbst | Sept. 30, 1947 |
| 2,443,784 | Bullen et al. | June 22, 1948 |
| 2,635,155 | Barr | Apr. 14, 1953 |
| 2,718,570 | Caldwell | Sept. 20, 1955 |
| 2,810,037 | Faus et al. | Oct. 15, 1957 |
| 2,823,282 | Rommel et al. | Feb. 11, 1958 |
| 2,824,189 | Zimmer | Feb. 18, 1958 |
| 2,827,529 | DeFligue | Mar. 18, 1958 |